United States Patent
Sato et al.

(10) Patent No.: US 6,366,348 B1
(45) Date of Patent: Apr. 2, 2002

(54) OPTICAL FIBER DISTORTION MEASURING APPARATUS AND OPTICAL FIBER DISTORTION MEASURING METHOD

(75) Inventors: Yasushi Sato; Haruyoshi Uchiyama; Toshio Kurashima, all of Tokyo (JP)

(73) Assignees: Ando Electric Co., Ltd.; Nippon Telegraph and Telephone Corporation, both of Tokyo (JP)

( * ) Notice: Subject to any disclaimer, the term of this patent is extended or adjusted under 35 U.S.C. 154(b) by 0 days.

(21) Appl. No.: 09/551,448

(22) Filed: Apr. 18, 2000

(30) Foreign Application Priority Data

Apr. 22, 1999 (JP) .......................... 11-115535

(51) Int. Cl.⁷ .............................. G01N 21/88
(52) U.S. Cl. .................................... 356/73.1
(58) Field of Search ................. 356/73.1, 459

(56) References Cited

U.S. PATENT DOCUMENTS

| | | | |
|---|---|---|---|
| 5,394,235 A | * 2/1995 | Takeuchi et al. | ........... 356/73.1 |
| 5,767,956 A | * 6/1998 | Yoshida | ...................... 356/73.1 |
| 5,949,533 A | * 9/1999 | Lee et al. | .................. 356/73.1 |

FOREIGN PATENT DOCUMENTS

GB         2 165 118     * 4/1986

* cited by examiner

Primary Examiner—Frank G. Font
Assistant Examiner—Sang H. Nguyen
(74) Attorney, Agent, or Firm—Darby & Darby

(57) ABSTRACT

The present invention provides an optical fiber distortion measuring apparatus and optical fiber distortion measuring method which make it possible to measure the amount of distortion of an optical fiber efficiently and in a short period of time. The time change waveform when a light pulse having a frequency of v1 is applied is compared with initial data (the time change waveform obtained in a case in which there is no distortion). Then, the light intensity L1 at a position Dx at which the light intensities do not agree is obtained. Next, the time change waveform is measured when a light pulse having a frequency of v2 is applied, and the light intensity L2 at position Dx is obtained. After this, the loss (resulting from distortion) in light intensities L1 and L2 is corrected, and light intensities LC1 and LC2 are obtained. Curve calculating unit 17 obtains a second-order curve which is a curve resulting from the parallel movement of a curve approximating the spectrum waveform of the initial data, and which contains the (v1, LC1) and (v2, LC2) described above. The peak frequency detecting unit 12 obtains the light frequency exhibiting a maximum value in the light intensity in the second-order curve. The distortion amount calculating unit 13 calculates the amount of distortion based on this light frequency.

6 Claims, 7 Drawing Sheets

FIG.2

PRIOR TO MEASUREMENT

- MEASURE INITIAL DATA — P1
- MEASURE RAYLEIGH SCATTERING LIGHT (FREQUENCY: $\nu 0$) — P2
- MEASURE PEAK BRILLOUIN SCATTERING LIGHT (PEAK FREQUENCY: $\nu 1$) — P3
- MEASURE BRILLOUIN SCATTERING LIGHT LOWER BY X (dB) THAN PEAK (FREQUENCY: $\nu 2$) — P4

DURING MEASUREMENT

- MEASURE TIME CHANGE WAVEFORM USING A LIGHT PULSE OF $\nu 0$ — S1
- COMPARE MEASURED WAVEFORM WITH INITIAL DATA — S2
- SET CHANGE IN LEVEL AS OFFSET VALUE FOR SUBSEQUENT CALCULATION — S3
- MEASURE TIME CHANGE WAVEFORM USING A LIGHT PULSE OF $\nu 1$ — S4
- COMPARE MEASURED WAVEFORM WITH INITIAL DATA — S5
- SET LIGHT INTENSITY AT DETECTION POINT Dx AS L1 — S6
- MEASURE TIME CHANGE WAVEFORM USING A LIGHT PULSE OF $\nu 2$ — S7
- SET LIGHT INTENSITY AT DETECTION POINT Dx AS L2 — S8
- DETERMINE SECOND-ORDER CURVE CONTAINING ($\nu 1$, LC1) AND ($\nu 2$, LC2) — S9
- DETERMINE PEAK FREQUENCY IN SECOND-ORDER CURVE — S10
- CALCULATE AMOUNT OF DISTORTION BASED ON PEAK FREQUENCY — S11

OPTICAL FIBER DISTORTION MEASURING APPARATUS AND OPTICAL FIBER DISTORTION MEASURING METHOD

BACKGROUND OF THE INVENTION

1. Field of the Invention

The present invention relates to a optical fiber distortion measuring apparatus and optical fiber distortion measuring method which detect back scatter light generated by directing an optical pulse into an assessed optical fiber, and based on the results of this detection, obtain the amount of distortion in the assessed optical fiber.

2. Background Art

When a distortion is generated at a position in an optical fiber, the frequency distribution (spectra) of the Brillouin scattering light generated at that position when a light pulse is directed into the optical fiber is shifted by an amount proportional to the amount of distortion, when compared with the case in which a distortion is not present.

Optical fiber distortion measuring apparatuses which measure the amount of distortion in an optical fiber which is the subject of the measurement (an assessed optical fiber) using this principle were conventionally known.

FIG. 5 is a block diagram showing an example of a conventional optical fiber distortion measuring apparatus. This apparatus comprises a light source 1, an optical coupler 2, a light frequency conversion circuit 3, a light pulse output circuit 4, an optical coupler 5, a light receiving circuit 7, an amplifier circuit 8, an A/D conversion circuit 9, a signal processing unit 10, a curve approximating unit 11, a peak frequency detecting unit 12, a distortion amount calculating unit 13, and a display unit 14. The operation of the optical fiber distortion measuring apparatus having the structure described above will be explained.

(1) Measurement of the Time Change Waveform

The optical fiber distortion measuring apparatus shown in FIG. 5 obtains the time change waveform shown in FIG. 6 by directing an optical pulse from one end of the assessed optical fiber. In FIG. 6, the horizontal axis indicates time from the application of the light pulse. Here, the time from the application of the light pulse corresponds to the distance from the input end of the assessed optical fiber 6 to each position in the assessed optical fiber 6. Furthermore, the vertical axis shows the intensity of the Brillouin scattering light generated at each position.

The measurement operation of the time change waveform described above by the optical fiber distortion measuring apparatus shown in FIG. 5 will be explained. In FIG. 5, light source 1 generates a constant light (CW light) and a series of light pulses having a constant difference in light frequency from the constant light. The constant light generated by light source 1 is directed into the light receiving circuit 7 via optical coupler 2, while the series of light pulses generated by light source 1 are directed to the light frequency conversion circuit 3 via optical coupler 2.

Light frequency conversion circuit 3 conducts a frequency shift of the light frequency of the series of light pulses generated by light source 1, and converts them to a predetermined light frequency v. Then, light pulse output circuit 4 outputs one light pulse from among the series of light pulses having a light frequency of v, and the outputted light pulse is directed into the assessed optical fiber 6 via optical coupler 5.

When the optical pulse is directed into the assessed optical fiber 6, Brillouin scattering light is generated at each position in assessed optical fiber 6. The Brillouin scattering light generated at each position in assessed optical fiber 6 is successively directed into light receiving circuit 7 via optical coupler 5 while being delayed by an amount of time proportional to the distance from the input end of the assessed optical fiber 6 to each position.

Using the constant light (CW light) generated by light source 1, light receiving circuit 7 successively conducts the coherent detection of the Brillouin scattering light generated at each position in assessed optical fiber 6, and outputs electrical signals proportional to the intensity of each Brillouin scattering light.

Amplifier circuit 8 amplifies the electrical signal outputted by light receiving circuit 7, and A/D conversion circuit 9 conducts the A/D conversion of the electrical signals amplified by amplifier circuit 8.

Signal processing unit 10 first conducts signal processing such as noise removal, logarithmic conversion, and the like with respect to the electrical signal values which were A/D converted, and then conducts plotting such that the electrical signal values are correlated with the amount of time elapsed from the application of the light pulse (that is to say, the distance from the input end of the assessed optical fiber), and generates the time change waveform shown in FIG. 6. By means of the above processing, the Brillouin scatting light time change waveform is obtained in the case in which a light pulse having a light frequency v is inputted.

(2) Calculation of the Amount of Distortion

Next, the method for calculating the amount of distortion of the assessed optical fiber 6 will be explained. When the amount of distortion of the assessed optical fiber 6 is calculated, the optical fiber distortion measurement apparatus shown in FIG. 5 repeats the operations described in (1) above while successively altering, by a specified value, the light frequency v of the light pulse inputted into the assessed optical fiber 6, using the frequency conversion circuit 3. By means of this, the time change waveform, an example of which is shown in FIG. 6, is obtained with respect to a plurality of light frequencies.

FIG. 7 is a three-dimensional graph showing an example of time change waveforms relating to a plurality of light frequencies. In the figure, the horizontal axis indicates the light frequency v of the light pulse inputted into the assessed optical fiber 6, while the vertical axis indicates the intensity of the Brillouin scattering light, and the axis which intersects both these axis at right angles (the angled axis) indicates the time from the input of the light pulse (the distance from the input end of the assessed optical fiber 6; that is to say, the position within the assessed optical fiber 6). In other words, the coordinate plane formed by the vertical axis and the angled axis in FIG. 7 corresponds to the coordinate plane shown in FIG. 6.

Furthermore, FIG. 8 is a graph in which the three-dimensional graph shown in FIG. 7 is sectioned at a certain distance D along the angled axis (the distance from the input end of the assessed optical fiber). In other words, FIG. 8 is a waveform (spectrum waveform) showing the frequency distribution (spectra) of the Brillouin scattering light at distance D.

When a spectrum waveform (see FIG. 8) is obtained at this certain distance D by means of this processing, then the curve approximating unit 11 shown in FIG. 5 applies the data shown by the spectrum waveform to a second-order formula, and produces an approximate curve (a second-order curve) of the spectrum waveform.

Then, the peak frequency determining unit 12 differentiates this approximate curve, and determines a light frequency indicating the maximum value of the intensity of the Brillouin scattering light (the peak frequency vp).

Finally, distortion amount calculating unit 13 substitutes the peak frequency νp determined by the peak frequency calculating unit 12 into the formula (1) shown below, and calculates the amount of distortion ε.

$$\epsilon = (\nu p - \nu b)/(\nu b \times K) \quad (1)$$

νb: peak frequency when there is no distortion (characteristic value for assessed optical fiber 6)

K: distortion coefficient By means of the processing described above, the amount of distortion ε at a position within the assessed optical fiber 6 (at a distance D from the input end) is determined and is displayed in display unit 14.

However, in the conventional optical fiber distortion measuring apparatus described above, when the amount of distortion of an assessed optical fiber is calculated, as described above, it is necessary to measure the time change waveforms of the Brillouin scattering light when a light pulse is applied with respect to a plurality (concretely, between 40 and 100) of light pulse frequencies while successively changing the light frequency ν.

Conventionally, 2–3 seconds were required to carry out the averaging processing in the measurement of a single time change waveform, so that when the distortion of an assessed optical fiber was measured, 40 to 100 times this amount of time, that is to say, maximally 6 minutes, were required.

In this way, in the conventional optical fiber distortion measuring apparatus, a very large amount of time was required for the measurement of the amount of distortion of the assessed optical fiber, so that the measurement efficiency was poor.

SUMMARY OF THE INVENTION

The object of the present invention is to provide an optical fiber distortion measuring apparatus and optical fiber distortion measuring method which make it possible to efficiently measure the amount of distortion of an assessed optical fiber in a short period of time.

The optical fiber distortion measuring apparatus of the present invention comprises:

a first measuring mechanism for measuring the difference in level between back scatter light from a undistorted assessed optical fiber and back scatter light from a distorted assessed optical fiber, with respect to the case in which the same light signal is directed into the undistorted assessed optical fiber, which is an optical fiber in a state in which no distortions are present, and the distorted assessed optical fiber, which is an optical fiber having the same structure as that of the undistorted assessed optical fiber, but in which distortions have been generated;

a second measuring mechanism for directing a light signal having a first light frequency into the undistorted assessed optical fiber and for obtaining an initial time change waveform indicating the intensity of back scatter light generated at each position in the undistorted assessed optical fiber;

a third measuring mechanism for directing a light signal having a first light frequency into the distorted assessed optical fiber and for obtaining a first time change waveform indicating the light intensity of the back scatter light generated at each position in the distorted assessed optical fiber;

a comparing mechanism for comparing the first time change waveform and the initial time change waveform and for detecting a detection point at which the light intensities differ from one another;

a fourth measuring mechanism for directing a light signal having a second light frequency into the distorted assessed optical fiber and obtaining a second time change waveform;

a correction mechanism for correcting a first light intensity, which is a light intensity at the detection point in the first time change waveform, on the basis of the difference in level, and for correcting a second light intensity, which is a light intensity at the detection point in the second time change waveform, on the basis of the difference in level;

a curve calculating mechanism for calculating, with respect to a spectrum waveform showing the relationship between the light frequency of the incident light and the intensity of the back scatter light generated at the detection points, a curve resulting from a parallel movement of a curve approximating the spectrum waveform relating to the undistorted assessed optical fiber, which curve satisfies the relationships between the first light frequency and first light intensity after correction, and satisfies the relationship between the second light frequency and second light intensity after correction;

a peak frequency calculating mechanism for calculating the light frequency exhibiting a maximal light intensity in the curve obtained by the curve calculating mechanism; and a distortion amount calculating mechanism for calculating an amount of distortion of the assessed optical fiber at the detection point based on the light frequency obtained by the peak frequency calculating mechanism.

In accordance with the present invention, it is possible to measure the amount of distortion in an assessed optical fiber efficiently and in a short period of time.

The second, third, and fourth measuring mechanism may comprise, respectively, a light source for generating the light signal; a light frequency conversion mechanism for converting the frequency of the light signal generated by the light source, and directing the light signal into the assessed optical fiber; a light receiving mechanism for receiving back scatter light generated by the assessed optical fiber and for outputting an electrical signal which is proportionate to the intensity of the back scatter light, and a signal processing mechanism for outputting the time change waveform based on the electrical signal outputted by the light receiving mechanism.

The back scatter light handled by the first measuring mechanism may be Rayleigh scattering light, and back scatter light handled by the second, third, and fourth measuring mechanism may be Brillouin scattering light.

On the other hand, the optical fiber distortion measuring method of the present invention comprises:

a first process for measuring the difference in level between back scatter light from a undistorted assessed optical fiber and back scatter light from a distorted assessed optical fiber, with respect to the case in which the same light signal is directed into the undistorted assessed optical fiber, which is an optical fiber in a state in which no distortions are present, and the distorted assessed optical fiber, which is an optical fiber having the same structure as that of the undistorted assessed optical fiber, but in which distortions have been generated;

a second process for directing a light signal having a first light frequency into the undistorted assessed optical fiber and for obtaining an initial time change waveform indicating the intensity of back scatter light generated at each position in the undistorted assessed optical fiber;

a third process for directing a light signal having a first light frequency into the distorted assessed optical fiber and for obtaining a first time change waveform indicating the light intensity of the back scatter light generated at each position in the distorted assessed optical fiber;

a fourth process for comparing the first time change waveform and the initial time change waveform and for detecting a detection point at which the light intensities differ from one another;

a fifth process for directing a light signal having a second light frequency into the distorted assessed optical fiber and obtaining a second time change waveform;

a sixth process for correcting a first light intensity, which is a light intensity at the detection point in the first time change waveform, on the basis of the difference in level, and for correcting a second light intensity, which is a light intensity at the detection point in the second time change waveform, on the basis of the difference in level;

a seventh process for calculating, with respect to a spectrum waveform showing the relationship between the light frequency of the incident light and the intensity of the back scatter light generated at the detection points, a curve resulting from a parallel movement of a curve approximating the spectrum waveform relating to the undistorted assessed optical fiber, which curve satisfies the relationships between the first light frequency and first light intensity after correction, and satisfies the relationship between the second light frequency and second light intensity after correction;

an eighth process for calculating the light frequency exhibiting a maximal light intensity in the curve obtained in the seventh process; and a ninth process for calculating an amount of distortion of the assessed optical fiber at the detection point based on the light frequency exhibiting a maximal value obtained in the eighth process.

The second, third, and fifth processes may comprise, respectively, a process for generating the light signal; a process for converting the frequency of the light signal, and directing the light signal into the assessed optical fiber; a process for receiving back scatter light generated by the assessed optical fiber and for outputting an electrical signal which is proportionate to the intensity of the back scatter light, and a process for outputting the time change waveform based on the electrical signal.

The back scatter light in the first process may be Rayleigh scattering light, and the back scatter light in the second, third, and seventh processes may be Brillouin scattering light.

BRIEF DESCRIPTION OF THE DRAWINGS

FIG. 2 is a flow chart showing an example of the operation of the optical fiber distortion measuring apparatus described above.

DETAILED DESCRIPTION OF THE PREFERRED EMBODIMENTS

Figure 1:
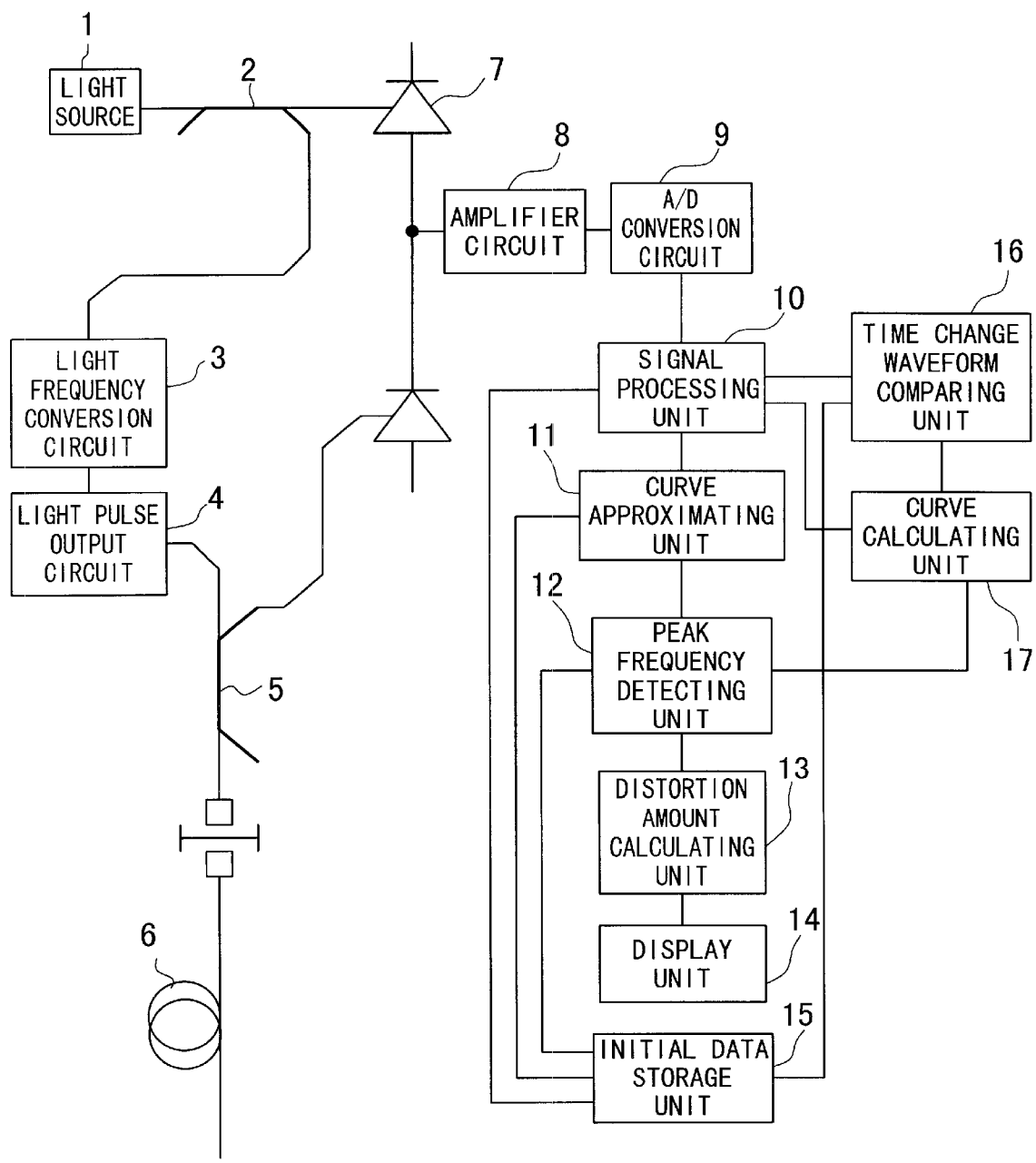
FIG. 1 is a block diagram showing an example of an optical fiber distortion measuring apparatus in accordance with an embodiment of the present invention.
Figure 5:
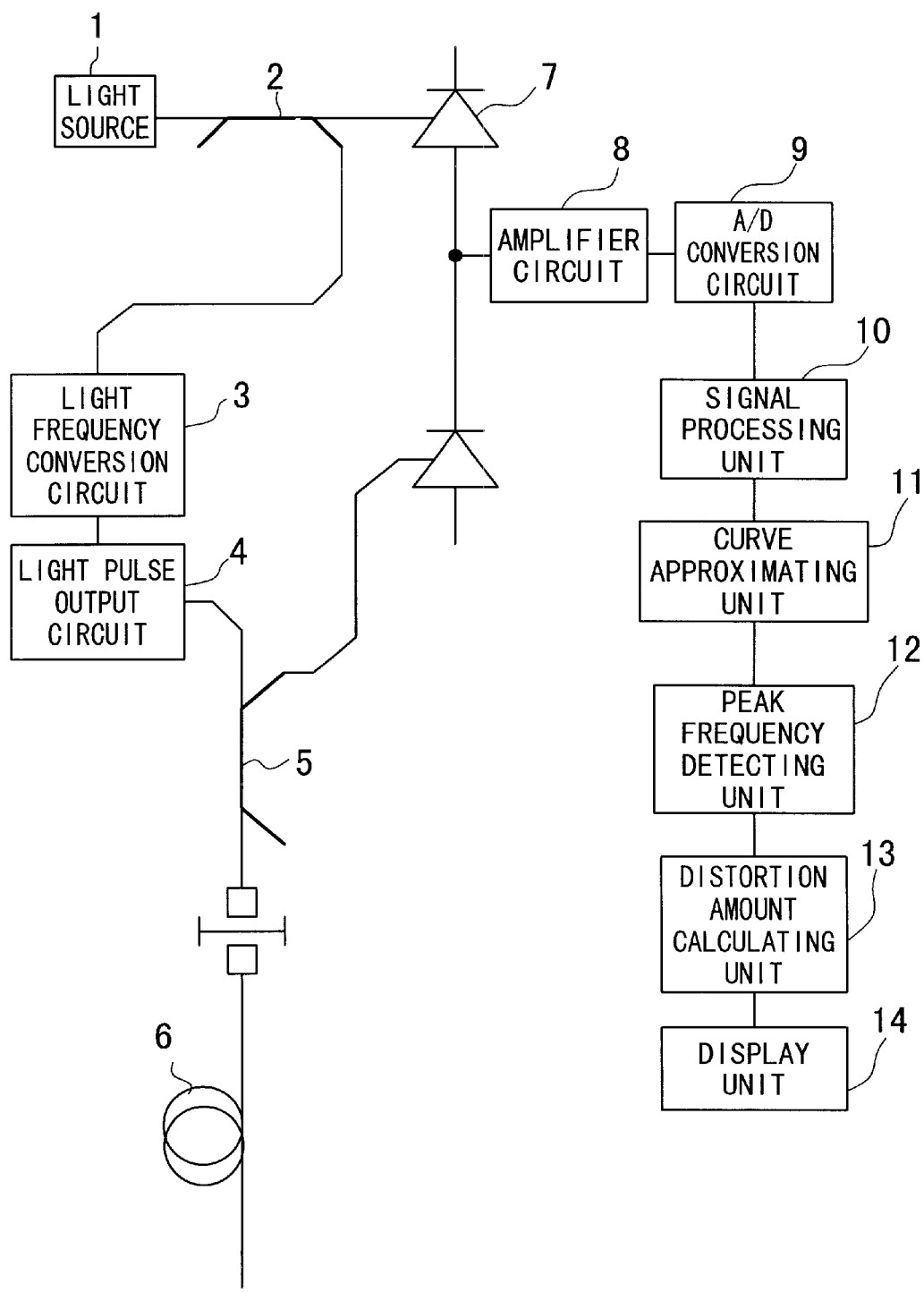
FIG. 5 is a block diagram showing an example of the structure of a conventional optical fiber distortion measuring apparatus.

FIG. 1 is a block diagram showing an embodiment of an optical fiber distortion measuring apparatus in accordance with the present invention. In this figure, those parts corresponding to the parts shown in FIG. 5 are given identical reference numbers, and an explanation thereof will be omitted here.

In this apparatus, an initial data storage unit 15, a time change waveform comparing unit 16, and a curve calculating unit 17 are provided. The initial data storage unit 15 serves to store the initial data measured in advance prior to the measurement of the distortion distribution (the measurement data of assessed optical fiber 6 in the state in which there is no distortion); concretely, this is a large capacity memory device such as a non-volatile IC memory, a hard disk apparatus, a magnetooptical disc, or the like.

The time change waveform comparing unit 16 and the curve calculating unit 17 may, as one example, comprise a CPU (central processing unit) and the peripheral circuitry thereof; this CPU conducts the following operations based on control programs which are stored in ROM (read only memory) or the like.

The operation of the optical fiber distortion measuring device having the structure described above will be explained.

Figure 7:
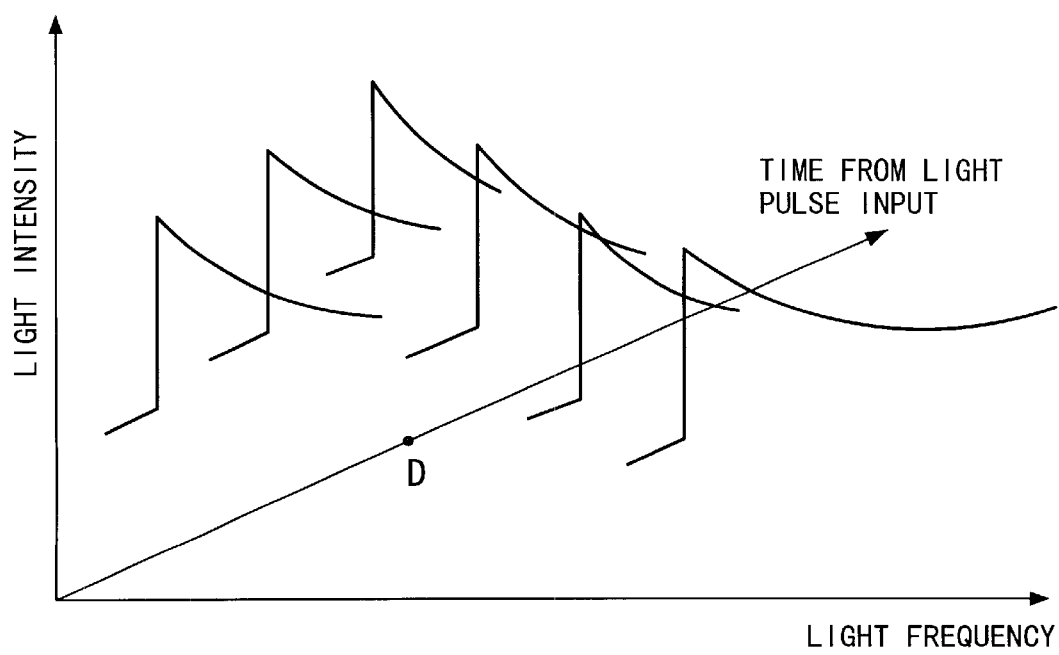
FIG. 7 is a three-dimensional graph showing an example of time change waveforms with respect to various light frequencies.

FIG. 2 is a flow chart showing an example of the operation of this optical fiber distortion measuring apparatus. This apparatus conducts processing (1) and (2) which is the same as that in the conventional apparatus (see FIG. 5), with respect to an assessed optical fiber which has no distortion, prior to measuring the distortion of the assessed optical fiber 6. This measurement data (see FIG. 7) is stored in initial data storage unit 15 as the initial data (step P1).

In the same way, using a light pulse of frequency v0, the present apparatus measures the Rayleigh scattering light with respect to the optical fiber which has no distortion. This process is the same as the processing (1) of the conventional apparatus (see FIG. 5). By means of this, a time change waveform of the Rayleigh scattering light is obtained. The present apparatus stores this time change waveform in initial data storage unit 15 as the initial data R0 (step P2). The order of processing of steps P1 and P2 may be interchanged.

Figure 8:
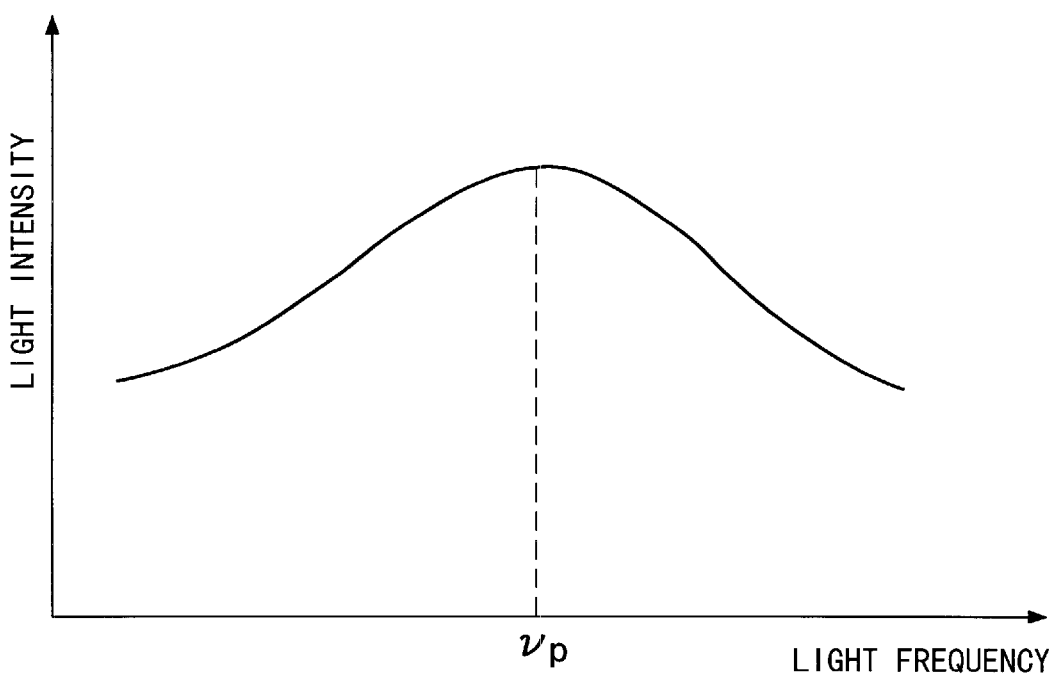
FIG. 8 is a graph showing an example of a spectrum waveform.

Next, based on the initial data obtained in step P1, the spectrum waveform (see FIG. 8) is obtained, and the peak frequency of this spectrum waveform is made frequency v1 (step P3). Furthermore, in the spectrum waveform, the frequency of the light intensity at which the light intensity at the peak frequency v1 decreases by a predetermined amount (this will temporarily be assumed to be x (dB)) is made frequency v2 (step P4). The spectrum waveform described above approximates a second-order curve, so that it is to be expected that two frequencies will exist which meet such conditions; however, no obstacle will be presented in the following processing no matter which value is selected, so that one or the other value may be used as light frequency v2.

Next, the measurement of the amount of distortion in an actual subjective measurement (an assessed optical fiber 6 in which distortion is present) is initiated.

First, the present apparatus uses a light pulse having a frequency of v0 and measures the level of the Rayleigh scattering light with respect to the assessed optical fiber 6 in which distortion is present, in the same way as in step P2 above, and thereby, attains the time change waveform Rr thereof (step S1).

When the time change waveform Rr is obtained, a comparison is made between this time change waveform Rr and the time change waveform R0 (which was obtained in step P2 above) (step S2).

The results of this comparison, that is to say, the level fluctuation value (R0-Rr) is stored as the offset "O" used during distortion measurement (step S3). The time change waveforms are compared, so that the offset O described above also exists as a time change waveform. In this time change waveform, the offset value at a distance (time from the input of the light pulse) Dx is designated Ox.

After obtaining the offset O described above, the present apparatus measures the time change waveform of the Rayleigh scattering light in the case in which a light pulse having a frequency of v1 is applied, using the same processing as in the "(1) Measurement of the Time Change Waveform" section described above (step S4).

Figure 3:
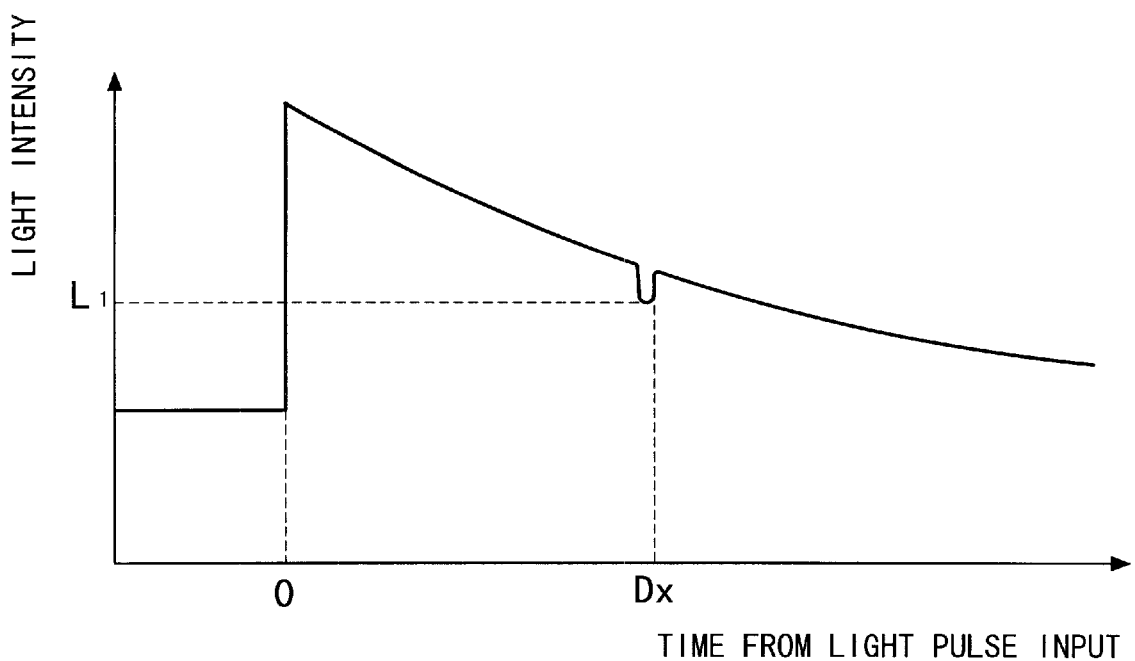
FIG. 3 is a graph showing of a time change waveform of Brillouin scattering light.
Figure 6:
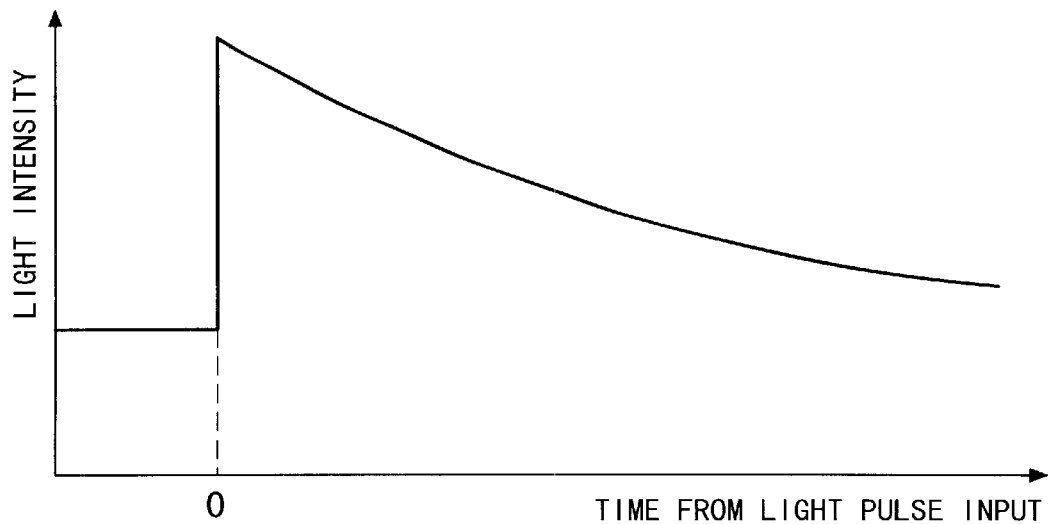
FIG. 6 is a graph showing an example of a time change waveform of Brillouin scattering light.

In the present embodiment, as an example, the waveform shown in FIG. 6 was obtained as the time change waveform when there was no distortion (initial data), while the waveform shown in FIG. 3 was obtained as the time change waveform in the case in which distortion was present. In the time change waveform shown in FIG. 3, the light intensity at a distance Dx within the optical fiber 6 to be measured is decreased.

When the measurement of the time change waveform using a light frequency v1 is completed, then time change waveform comparing unit 16 compares the measured time change waveform (see FIG. 3) and the initial data (time change waveform in the case in which there is no distortion: see FIG. 6) stored in advance in the initial data storage unit with respect to light frequency v1, and outputs the position (distance from the input end) at which the light intensities of the Brillouin scattering light do not coincide (step S5).

The detected position Dx is used as a detection point, and, in the time change waveform measured in step S4, the intensity of the Brillouin scattering light at the detection point Dx is designated L1 (step S6).

When detection point Dx and optical intensity L1 are obtained, the present apparatus measures the time change waveform of the Brillouin scattering light in the case in which a light pulse having a light frequency of v2 is applied, using processing which is the same as that in the "(1) Measurement of the Time Change Waveform" section described above (step S7).

Here, in the measured time change waveform, the intensity of the Brillouin scattering light at detection point Dx is designated L2 (step S8).

By means of the processing described above, the spectrum waveform data (v1, L1) and (v2, L2) at the detection point Dx are obtained; however, in actuality, a loss (in assessed optical fiber 6) is simultaneously produced by the distortion of assessed optical fiber 6, and for this reason, the intensities L1 and L2 of the Brillouin scattering light are somewhat lower than the actual values. Using the offset value Ox determined in step S3, these light intensities L1 and L2 are corrected. Concretely, by adding the offset value Ox to both the light intensities L1 and L2, corrected light intensities LC1 and LC2 are obtained. That is to say, LC1=L1+Ox LC2=L2+Ox.

By means of the processing described above, when the corrected spectrum waveform data (v1, LC1) and (v2, LC2) at the detection point Dx are obtained, then based on these values, curve calculating unit 17 finds a second-order curve which is a curve representing a parallel movement of a second-order curve approximating the spectrum waveform of the initial data at the detection point Dx, and which contains the (v1, LC1) and (v2, LC2) described above (step S9).

An example of the method of determining this second-order curve is given below. First, if the second-order curve which approximates the spectrum waveform of the initial data is represented by $y=ax^2+bx+c$ (where a, b, and c are known coefficients, value x corresponds to the frequency v of the light pulse, and variable y corresponds to the light intensity L of the Brillouin scattering light), the second-order coefficient (the coefficient of $x^2$) of the curve representing the parallel movement of the second order curve is also a.

Then, with respect to the second order curve $y=ax^2+nx+m$ containing the unknown coefficients n and m, (v1, LC1) and (v2, LC2) described above are substituted for the variables (x, y), and binary simultaneous equations are constructed, and by thus solving for the values of the unknown coefficients n and m, it is possible to arrive at the desired second-order curve.

When the desired second-order curve is obtained, the peak frequency detecting unit 12 differentiates the second-order curve and obtains the light frequency exhibiting a maximum value of the intensity of the Brillouin scattering light (the peak frequency vp) (step S10).

Then, distortion amount calculating unit 13 substitutes the peak frequency v p obtained by the peak frequency detecting unit 12 into the formula (1) described above, and calculates the amount of distortion $\epsilon$ (step S11).

By means of the operations described above, the amount of distortion $\epsilon$ at the detection point Dx is calculated, and this is displayed in display unit 14.

In the optical fiber distortion measuring apparatus in accordance with the present embodiment, it is also possible to make a determination as to the direction of distortion (extending distortion/contracting distortion) in assessed optical fiber 6.

When the corrected spectrum waveform data (v1, LC1) and (v2, LC2) are obtained, the light intensities LC1 and LC2 are compared, and when LC1 is less than LC2, then a determination is made that the direction of distortion of the assessed optical fiber 6 is "extending distortion", while when LC1 is greater than LC2, a determination is made that the direction of distortion of the assessed optical fiber 6 is "contracting distortion".

Figure 4A:
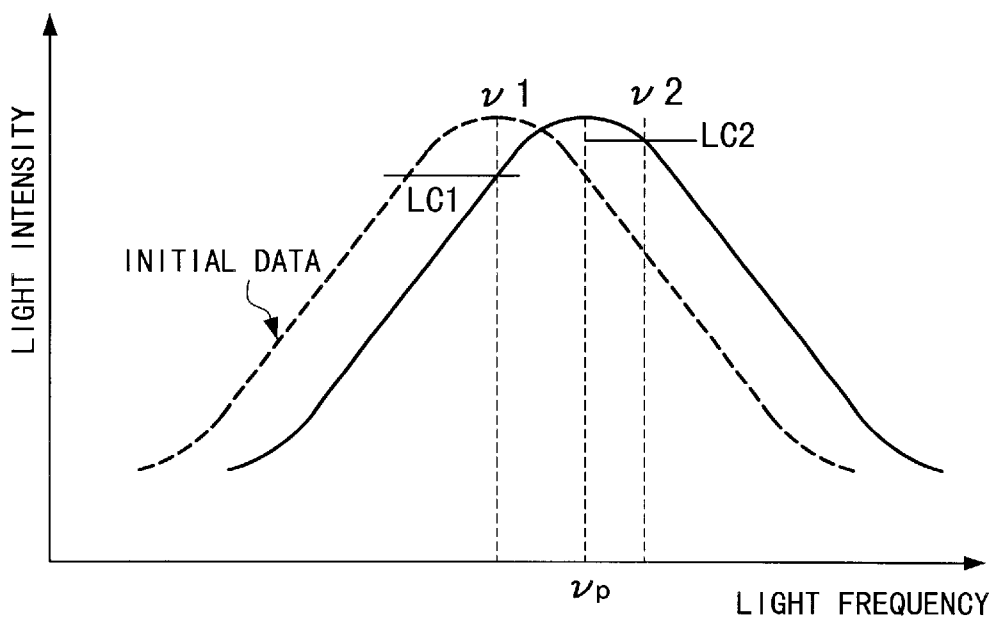
FIG. 4A is a graph showing an example of the shift of the spectrum waveform in the case of extending distortion.

The basis for this determination will be explained with reference to FIGS. 4A and 4B. When the direction of distortion is "extending distortion", as shown in FIG. 4A, the spectrum waveform of the Brillouin scattering light is shifted to the right (in the direction of higher light frequencies). As is clear from FIG. 4A, when LC1 and LC2 are compared, the relationship is such that LC1 is less than LC2. For this reason, when LC1 is less than LC2, the direction of distortion of the assessed optical fiber 6 is determined to be "extending distortion."

Figure 4B:
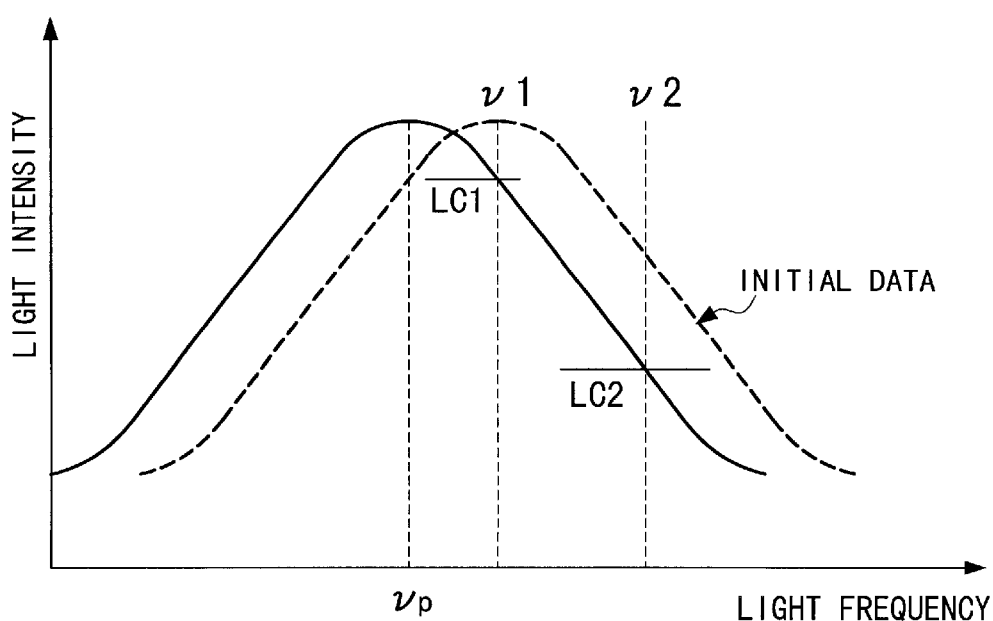
FIG. 4B is a graph showing an example of the shift of the spectrum waveform in the case of contracting distortion.

On the other hand, when the direction of distortion is "contracting distortion", as shown in FIG. 4B, the spectrum waveform of the Brillouin scattering light is shifted to the left (in the direction of lower light frequencies). As is clear from FIG. 4B, when LC1 and LC2 are compared, the relationship is such that LC1 is greater than LC2. For this reason, when LC1 is greater than LC2, the direction of distortion of the assessed optical fiber 6 is determined to be "contracting distortion."

In this way, in the optical fiber distortion measuring apparatus in accordance with the present embodiment, it is possible to make a determination as to the direction of distortion (extending/contracting distortion) of assessed optical fiber 6.

As described above, in accordance with the present invention, it is possible to measure the amount of distortion in an assessed optical fiber efficiently and in a short period of time.

Embodiments of the present invention were described in detail above based on the figures; however, the concrete structure is not necessarily limited to that in these embodiments, and modifications thereto are possible insofar as the essential features of the present invention are present.

Next, the relationships of inclusion among the various means of the claims, and the corresponding relationships between these means and the embodiment, will be explained. In the relationships of inclusion described below, the included means (subordinate means) is depicted in an indented fashion with respect to the including means (superordinate means).

Second measuring means, third measuring means, fourth measuring means
   Light source . . . . . . Light source 1
   Light frequency conversion means . . . . . . Light frequency conversion circuit 3
   Light receiving means . . . . . . Light receiving circuit 7
   Signal processing means . . . . . . Amplifier circuit 8, A/D conversion circuit 9, signal processing unit 10
Comparing means . . . . . . Time change waveform comparing unit 16
Correcting means . . . . . . Time change waveform comparing unit 16
Curve calculating means . . . . . . Curve calculating unit 17
Peak frequency calculating means . . . Peak frequency calculating unit 12
Distortion amount calculating means . . . Distortion amount calculating unit 13

What is claimed is:

1. An optical fiber distortion measuring apparatus comprising:
   a first measuring device for measuring the difference in level between back scatter light from an undistorted optical fiber and back scatter light from a distorted optical fiber;
   a second measuring device for directing a light signal having a first light frequency into the undistorted optical fiber and for obtaining an initial time change waveform indicating the intensity of back scatter light generated at each position in the undistorted optical fiber;
   a third measuring device for directing a light signal having a first light frequency into the distorted optical fiber and for obtaining a first time change waveform indicating the light intensity of the back scatter light generated at each position in the distorted optical fiber;
   a comparing device for comparing the first time change waveform and the initial time change waveform and for detecting a detection point at which the light intensities differ from one another;
   a fourth measuring device for directing a light signal having a second light frequency into the distorted optical fiber and obtaining a second time change waveform;
   a correction device for correcting a first light intensity, which is a light intensity at the detection point in the first time change waveform, on the basis of the difference in level, and for correcting a second light intensity, which is a light intensity at the detection point in the second time change waveform, on the basis of the difference in level;
   a curve calculating device for calculating, with respect to a spectrum waveform showing the relationship between the light frequency of the incident light and the intensity of the back scatter light generated at the detection points, a curve resulting from a parallel movement of a curve approximating the spectrum waveform relating to the undistorted optical fiber, which curve satisfies the relationships between the first light frequency and first light intensity after correction, and satisfies the relationship between the second light frequency and second light intensity after correction;
   a peak frequency calculating device for calculating the light frequency exhibiting a maximal light intensity in the curve obtained by the curve calculating device; and
   a distortion amount calculating device for calculating an amount of distortion of the optical fiber at the detection point based on the light frequency obtained by the peak frequency calculating device.

2. An optical fiber distortion measuring apparatus in accordance with claim 1, wherein the second, third, and fourth measuring device comprise, respectively,
   a light source for generating the light signal;
   a light frequency conversion device for converting the frequency of the light signal generated by the light source, and directing the light signal into the optical fiber;
   a light receiving device for receiving back scatter light generated by the optical fiber and for outputting an electrical signal which is proportionate to the intensity of the back scatter light, and
   a signal processing device for outputting the time change waveform based on the electrical signal outputted by the light receiving device.

3. An optical fiber distortion measuring apparatus in accordance with claim 1, wherein the back scatter light handled by the first measuring device is Rayleigh scattering light, and the back scatter light handled by the second, third, and fourth measuring device is Brillouin scattering light.

4. An optical fiber distortion measuring method comprising:
   a first process for measuring the difference in level between back scatter light from a undistorted optical fiber and back scatter light from a distorted optical fiber, with respect to the case in which the same light signal is directed into the undistorted optical fiber, which is an optical fiber in a state in which no distortions are present, and the distorted optical fiber, which is an optical fiber having the same structure as that of the undistorted optical fiber, but in which distortions have been generated;

a second process for directing a light signal having a first light frequency into the undistorted optical fiber and for obtaining an initial time change waveform indicating the intensity of back scatter light generated at each position in the undistorted optical fiber;

a third process for directing a light signal having a first light frequency into the distorted optical fiber and for obtaining a first time change waveform indicating the light intensity of the back scatter light generated at each position in the distorted optical fiber;

a fourth process for comparing the first time change waveform and the initial time change waveform and for detecting a detection point at which the light intensities differ from one another;

a fifth process for directing a light signal having a second light frequency into the distorted optical fiber and obtaining a second time change waveform;

a sixth process for correcting a first light intensity, which is a light intensity at the detection point in the first time change waveform, on the basis of the difference in level, and for correcting a second light intensity, which is a light intensity at the detection point in the second time change waveform, on the basis of the difference in level;

a seventh process for calculating, with respect to a spectrum waveform showing the relationship between the light frequency of the incident light and the intensity of the back scatter light generated at the detection points, a curve resulting from a parallel movement of a curve approximating the spectrum waveform relating to the undistorted optical fiber, which curve satisfies the relationships between the first light frequency and first light intensity after correction, and satisfies the relationship between the second light frequency and second light intensity after correction;

an eighth process for calculating the light frequency exhibiting a maximal light intensity in the curve obtained in the seventh process; and a ninth process for calculating an amount of distortion of the optical fiber at the detection point based on the light frequency exhibiting a maximal value obtained in the eighth process.

5. An optical fiber distortion measuring method in accordance with claim 4, wherein the second, third, and fifth processes comprise, respectively, a process for generating the light signal;

a process for converting the frequency of the light signal, and directing the light signal into the optical fiber;

a process for receiving back scatter light generated by the optical fiber and for outputting an electrical signal which is proportionate to the intensity of the back scatter light, and a process for outputting the time change waveform based on the electrical signal.

6. An optical fiber distortion measuring method in accordance with claim 4, wherein back scatter light in the first process is Rayleigh scattering light, and back scatter light in the second, third, and seventh processes is Brillouin scattering light.

* * * * *